United States Patent [19]

Clough et al.

[11] Patent Number: 4,765,827

[45] Date of Patent: * Aug. 23, 1988

[54] METAL VALUE RECOVERY

[75] Inventors: Thomas J. Clough, Santa Monica; John W. Sibert, Malibu; Arthur C. Riese, Toluca Lake, all of Calif.

[73] Assignee: Ensci, Inc., Woodland Hills, Calif.

[*] Notice: The portion of the term of this patent subsequent to Jun. 21, 2005 has been disclaimed.

[21] Appl. No.: 5,130

[22] Filed: Jan. 20, 1987

[51] Int. Cl.$^4$ .............................................. C22B 11/04
[52] U.S. Cl. ....................................... 75/2; 75/101 R; 75/115; 75/118 R; 75/121; 423/27; 423/29; 423/30; 423/31; 423/41; 423/49; 423/52; 423/DIG. 4; 423/DIG. 17
[58] Field of Search ..................... 423/27, 29, 30, 31, 423/41, 49, 52, DIG. 4, DIG. 17; 75/2, 101 R, 115, 118 R, 121

[56] References Cited

U.S. PATENT DOCUMENTS

| | | | |
|---|---|---|---|
| 2,829,964 | 4/1958 | Zimmerley et al. | 423/DIG. 17 |
| 3,169,856 | 2/1965 | Mero | 423/DIG. 4 |
| 3,330,650 | 7/1967 | Zimmerley et al. | 423/DIG. 17 |
| 3,433,629 | 3/1969 | Imai et al. | 423/DIG. 17 |
| 3,988,416 | 10/1976 | Barner et al. | 423/DIG. 4 |
| 3,990,891 | 11/1976 | Sandberg et al. | 423/DIG. 4 |
| 4,002,717 | 1/1977 | Sandberg et al. | 75/101 R |
| 4,497,778 | 2/1985 | Pooley | 423/27 |
| 4,645,650 | 2/1987 | Fray et al. | 423/DIG. 4 |

OTHER PUBLICATIONS

Tuovinen, O. H. and Kelly, D. P., "Use of Micro-Organisms for the Recovery of Metals", International Metallurgical Reviews, vol. 19, 1974, pp. 21–31.

*Primary Examiner*—Robert L. Stoll
*Attorney, Agent, or Firm*—Frank J. Uxa

[57] ABSTRACT

A process for at least one of (1) recovering at least one first metal other than manganese from a first ore containing reducible manganese, and (2) recovering at least one second metal from a second ore containing the second metal and at least one metal sulfide of a metal other than the second metal and manganese; the process comprising at least one of: (A) contacting the first ore with an aqueous composition and a material containing at least one metal sulfide in the presence of a metal redox couple more positive than about +0.1 versus the standard hydrogen electrode, W. M. Latimer convention, at conditions effective to (1) chemically reduce at least a portion of the manganese, (2) oxidize at least a portion of the metal and/or the sulfide from the metal sulfide, and (3) at least partially liberate the first metal from the first ore, and recovering the first metal from the first ore; and (B) contacting the second ore with an aqueous composition and at least one reducible manganese-containing material in the presence of a metal redox couple more positive than about +0.1 versus the standard hydrogen electrode, W. M. Latimer convention, at conditions effective to (1) chemically reduce at least a portion of the manganese, (2) oxidize at least a portion of the metal and/or the sulfide from the metal sulfide, and (3) at least partially liberate the second metal from the second ore, and recovering the second metal from the second ore.

41 Claims, No Drawings

METAL VALUE RECOVERY

This invention relates to a process for recovering at least one first metal, e.g., silver, from an ore containing reducible manganese and the first metal. The invention also relates to a process for recovering at least one second metal, e.g., gold, from an ore containing metal sulfides and the second metal. In particular, the invention relates to a process for recovering the first metal and/or the second metal which involves processing the first metal, reducible manganese-containing ore and/or the second metal, metal-sulfide-containing ore so as to facilitate the recovery of the first metal and/or second metal from the ore.

Reducible manganese-containing ores quite often contain metal values which are difficult to recover because of the "locking" nature of the manganese in the ore. For example, the occurrence of manganese-locked silver ores has long been a problem for ore processors. Conventional smelting can treat small, limited quantities of manganese-locked silver ores when processing conventional ores. The manganese must be properly slagged to prevent attack of the crucibles. This consumes silica, increases energy required, and contributes to metal loss in the slag. Manganese-locked silver ores may be leached with sodium cyanide to recover silver, but such recovery is often limited by the manganese content. Manganese in such ores "locks" the silver in the ore by, for example, blocking access by the sodium cyanide solution to the silver-bearing or silver minerals.

Metal sulfide-containing ores often contain metal values, such as gold, the platinum group metals and the like, which are difficult to recover because of the "locking" nature of the metal sulfide in the ore. For example, the occurrence of insoluble metal sulfide-locked gold ores has long been a problem for ore processors. In addition, electrum-containing ores are also difficult to process for the recovery of precious metal values.

Use of sodium cyanide to remove silver from such manganese-locked silver ores or to remove gold from such gold metal sulfide-containing ores is usually uneconomical. Moreover, stringent air pollution control regulations and low metal prices have forced smelters to shut down or select ores from which metal values can be recovered relatively easily. Ores which include "locking" manganese (e.g., containing about 0.5% to about 35% by weight of manganese) are often considered marginal and may not be processed.

In an article entitled "The Cyanide Process for Gold and Silver Ores" by Frank A. Seeton appearing in *Deco Trefoil*, January-February, 1966, certain constituents are noted as "cyanicides" which may be present in gold and silver-containing ores. A "cyanicide" may be defined as a natural-occurring material that reacts with cyanide causing abnormal cyanide consumption and frequently influences dissolution and precipitation of gold and silver. Copper minerals are "cyanicides" and constitute a serious problem in cyanidation. Contents as low as 0.1 percent copper in the ore will create excessive cyanide consumption due to the formation of copper cyanide complexes and, in turn, have adverse effects on gold and silver dissolution and precipitation. Chalcopyrite is the least objectionable of the copper minerals. Arsenic and antimony sulfides dissolve in the alkaline solution and form compounds which will react with the oxygen in the cyanide solution and inhibit the dissolution of gold and silver values. To a lesser degree, zinc and nickel-bearing minerals may be troublesome. Generally, reduced sulfur-compounds which are not effective in leaching gold or silver.

Pyrrhotite is a common constituent of gold and silver ores and is not only a cyanicide but also consumes oxygen in the solution due to the decomposition of pyrrhotite. Various remedies for these conditions have been suggested such as pre-aeration in alkaline water solutions in the absence of cyanide and discarding the pre-aeration solution prior to cyanidation or the use of metallic salt in conjunction with low lime alkalinity during cyanidation.

Commonly assigned U.S. patent application Ser. No. 858,056 and 858,369, filed Apr. 30, 1986, disclose processes for the recovery of various metal values, e.g., silver, gold, and the platinum group metals, involving the use of reducible manganese components. These applications also include a more detailed discussion of certain prior art references. Also, commonly assigned U.S. patent application, Ser. No. 931246, filed Nov. 17, 1986, discloses a process to reduce the sulfur content of coal and petroleum. In certain embodiments, this process utilizes iron complexing agents, vanadium 5+components and copper 2+components to provide sulfur oxidation. All of these applications are incorporated in their entireties by reference herein. There continues to be a need for improved processing to recover metal values, in particular from reducible manganese-containing ores and metal sulfide ores.

Therefore, one object of the present invention is to provide a process for recovering at least one metal other than manganese from a reducible manganese-containing ore.

An additional object of the present invention is to provide a process for recovering at least one metal from a metal sulfide-containing ore. Other objects and advantages of the present invention will become apparent hereinafter.

An improved process for recovering at least one first metal other than manganese from a first ore containing reducible manganese, e.g., manganese generally in the plus three (+3) or four (+4) oxidation state, and/or for recovering at least one second metal from a second ore containing the second metal and at least one of certain sulfides of a metal other than manganese and the second metal has been discovered. In one broad aspect, the process involves: containing the first ore with an aqueous composition and a material, e.g., a metallurgical material, ore and the like, containing at least one metal sulfide in the presence of a metal redox couple more positive than about +0.1 versus the standard hydrogen electrode (W. M. Latimer convention) at conditions effective to (1) chemically reduce at least a portion of the manganese, (2) oxidize at least a portion of the metal and/or sulfide from the metal sulfide, and (3) at least partially liberate the first metal from the first ore; and recovering the first metal from the first ore. In another broad aspect, the process involves: contacting the second ore with an aqueous composition and at least one reducible manganese-containing material, e.g., a metallurgical material, ore and the like, in the presence of a metal redox couple more positive than about +0.1 versus the standard hydrogen electrode (W. M. Latimer convention) at conditions effective to (1) chemically reduce at least a portion of the manganese, (2) oxidize at least a portion of the metal and/or sulfide from the metal sulfide, and (3) at least partially liberate the second metal from the second ore; and recovering the second metal from the second ore. Preferably, the above-noted contacting is conducted in the presence of a metal redox couple more positive than about +0.5 versus the standard hydrogen electrode (W. M. Latimer convention). In one embodiment, the contacting occurs in the presence of an additional added oxidant, more preferably a gaseous source of oxygen, e.g., air, enriched/diluted air, oxygen and the like. In one embodiment, the redox couple is preferably selected from at least one of the following redox couples: (A) at least one added iron complexing agent in an amount effective to promote the oxidation of the metal and/or sulfide from the metal sulfide; (B) at least one added vanadium component in which vanadium is present in an amount in the 5+oxidation state effective to promote the oxidation of metal and/or sulfide from the metal sulfide; (C) at least one added copper component in which copper is present in an amount in the 2+oxidation state effective to promote oxidation of metal and/or sulfide from the metal sulfide; and mixtures thereof. Both first and second ores preferably contain precious metals, such as silver (e.g., first metal) and/or gold (e.g., second metal) which can be recovered using the process of this invention. The various embodiments of this invention can be practiced singly or in any combination of embodiments, with selection and optimization generally being a function of the ore type and desired metal value recovered.

The benefits resulting from the process of this invention, e.g., improved rate of oxidation including solubilization of the metal and/or sulfur species from the metal sulfide, and/or yield/recovery of desired metal as a function of time, are substantial. Without wishing to limit the invention to any specific theory of operation, it is believed that many of such benefits result from the promoting effect of one or more of the above metal redox couples in the process of this invention. The promoting effect of a redox couple allows the process to be effective, e.g., from the standpoint of improved recovery of desired metal as a function of time, on a wide variety of difficult to process ores.

In one embodiment, the metal sulfide has a formula of (Me)ySx wherein x and y are greater than zero, preferably x is greater than y and Me is a metal selected from the group consisting of Fe, Mo, As, Cu, Co, Ni, Sn, Sb, Bi, Pb, Zn and mixtures thereof. Such metal sulfides preferably include at least one S—S (sulfur to sulfur) bond. Such sulfides include pyrites, metal sulfides, iron pyrites and pyrite-like metal sulfides. Typical examples of metal sulfides and mixed metal sulfide ores are pyrite, pyrrhotite, marcasite, marionite, arsenopyrite, calcosite, chalcopyrite, covellite, bornite, sphalerite, pentlandite, millerite, stibnite, orpiment and realgar plus mixed metal sulfides. In another embodiment, the contacting occurs in the presence of *Thiobacillus ferrooxidans* in an amount effective to facilitate, e.g., generally to increase the rate of, the liberating of the first and second metals from the first and second ores respectively. The various embodiments are meant to be inclusive and not exclusive. That is, the (Me)ySx of the first embodiment may be used in conjunction with the *Thiobacillus ferrooxidans* of the second embodiment. *Thiobacillus ferrooxidans* are the preferred bacteria for use in the process of this invention, although *Thiobacillus thiooxidans* can be employed, e.g., either alone or in combination with other components, in an amount effective to enhance the oxidation of sulfur species of the metal sulfide.

The present process provides substantial advantages. For example, the use of at least one of certain promoting metal redox couples, preferably one or more iron complexing agents, vanadium components and copper components (with or without complexing agents), provides for improved contacting, e.g., to increase the rate of metal and/or sulfide oxidation and, ultimately to improve the yield of first metal and/or second metal recovered. The improved rate of metal and/or sulfide oxidation also results in significant process and cost economies. In addition, effective first and/or second, preferably first and second, metal recoveries can be achieved utilizing low grade (heretofore difficult to process) reducible manganese-containing ores and relatively inexpensive, plentiful metal sulfide-containing ores. Further the present process does not require the addition of sulfur dioxide or hydrogen sulfide to maintain or culture any bacteria.

The process of this invention is useful on any suitable first metal, reducible manganese-containing ore, e.g., an ore containing oxidized manganese. At least a portion of the manganese-bearing minerals from the spinel group. Particularly, the process is useful on silver, manganese-containing first ores in which at least a portion of the silver is locked by the manganese-bearing minerals such that at least a portion of the silver is not readily recovered using conventional techniques, e.g., cyanide extraction. Such silver, manganese-containing ores are "preconditioned" in the present contacting step so that at least a portion, preferably a major portion, of the silver is liberated from the ore. By "liberated from the ore" is meant that the desired metal (first and/or second metal) in the ore after the present contacting can be more effectively recovered using conventional (preferably cyanide extraction) processing relative to the uncontacted ore. In certain embodiments of the process of this invention, a metal sulfide-containing material is contacted with the manganese-containing ore.

The second metal, metal sulfide-containing ore which is used in the process of this invention may be suitable metallic sulfide ore. Preferably, the second ore includes one or more iron sulfides, in particular iron pyrites. Metal sulfide-containing second ores useful in this invention may include other minerals or compounds in amounts which do not substantially interfere or deleteriously affect the present process. The metal sulfide-containing second ore also includes one or more valuable second metals, such as gold, the platinum group metals and mixtures thereof. The present contacting step provides for at least partially liberating the second metal or metals from the sulfide-containing second ore. At least a portion, preferably a major portion of the second metal is liberated from the second ore. This second ore containing the desired second metal or metals, after contacting according to the present invention, is subjected to additional processing during which the second metal or metals are recovered from the contacted second ore.

In embodiments of the present invention in which the presence of *Thiobacillus ferrooxidans* is optional, the metal sulfide is preferably pyrites selected from a group consisting of iron pyrites, chalcopyrite, arsenopyrite, pyrrhotite and mixtures thereof. More preferably, the metal sulfide comprises iron pyrites.

In embodiments of the invention which require the presence of *Thiobacillus ferrooxidans* any suitable metal sulfide capable of performing at the conditions of the present contacting step, and preferably capable of being oxidized by the bacteria, may be used. Because of cost, availability and performance considerations, the preferred metal sulfide for use in these embodiments is iron sulfide, in particular iron pyrites.

The amount of metal sulfide employed in the present contacting step should be sufficient to provide the chemical reduction/oxidation/first metal liberation to the desired degree. Preferably, the amount of metal sulfide employed should be about 40% to about 250%, more preferably about 80% to 120%, of that required to achieve the desired degree of manganese chemical reduction. Substantial excesses of metal sulfides should be avoided since such excesses may result in materials separation and handling problems, and may even result in reduced recovery of the desired first metal or metals. The amount of reducible manganese employed in the present contacting step should be sufficient to provide the chemical reduction/oxidation/second metal liberation to the desired degree. Preferably, the amount of reducible manganese employed should be about 40% to about 250%, more preferably about 80% to 120%, of that required to achieve the desired degree of metal and/or sulfide oxidation. Substantial excesses of reducible manganese should be avoided since such excesses may result in materials separation and handling problems, and may result in reduced recovery of the desired second metal or metals.

The metal sulfide component which is used in the first metal recovery embodiment of this invention may be any metallic sulfide ore, including arsenic, zinc, iron, cobalt, nickel, tin, lead, and copper. The metal sulfide may be in any size or form. The metal sulfide component may be intermixed with the manganese-containing ore or brought in contact with the manganese-containing ore by the aqueous, acidic composition which is in turn intermixed with the manganese-containing ore. Metal sulfide components useful in this invention may include other minerals or compounds in amounts which do not substantially interfere or deleteriously affect the present process.

In one embodiment, the present invention involves conducting the contacting step of the present invention in the presence of at least one iron complexing agent (iron complex) in an amount effective to promote the oxidation of themetal and/or the sulfide from the metal sulfide. The specific amount of iron complexing agent employed may vary over a wide range, and depends, for example, on the metal sulfide and complexing agent employed, and on the degree of oxidation desired. Preferably, the mole ratio of complexing agent to metal ion that it used to form the promoter is in the range of about 0.01 to 5, more preferably about 0.5 to about 2.0. Preferred concentrations of iron complexing agent are in the range of abou 150 to 10,000 ppm, more preferably about 200 to about 1,000 ppm., by weight based upon the acidic, aqueous composition, calculated as elemental iron. It is generally convenient to provide the iron complexing agent in combination with, preferably in solution in, the aqueous, acidic composition used in the contacting step.

Suitable iron complexing agents for use in this invention are compounds which can complex ferrous and/or ferric ions, preferably ferrous ions, to enhance the oxidizing potential of the iron redox couple.

Convenient compilations providing stability constants of many complexing agents for iron are provided in Martell and Calvin, "Chemistry of the Metal Chelate Compounds," U.S. copyright 1952, and "Stability Constants of Metal-Ion Complexes," supplement No. 1, Special Publication No. 25, published by The Chemical Society, U.S. copyright 1971, which material is incorporated herein in its entirety by reference.

Examples of suitable iron complexing agents include the following: poly-functional amines, for example, ethylenediamine, propylene diamine, ethanol amine, glycine, and asparagine and salts thereof; phosphonic acids and phosphonic acid salts, for example, ethane-1-hydroxy-1, 1-diphosphonic acid; pyridine and substituted, chelating pyridine derivatives, for example, phenanthroline and 2, 2'-bipyridyl; glyoxime and salicylaldehyde derivatives; and condensed phosphates. Especially suitable salt forms of iron complexing agents are the potassium, sodium and ammonium salts. Mixtures of complexing compounds can be very desirably employed. Particularly preferred iron complexing agents for use in the present invention are those selected from bifunctional amines, pyridine and substituted, chelating pyridine derivatives.

As will be recognized by those skilled in the art, the stability of the ferrout and ferric complexes formed will often be affected by the pH of the aqueous composition employed in the present contacting step. Some stability of the complex or complexes may have to be sacrificed because of the relatively low pH of the aqueous composition during the contacting. This reduced complex stability has surprisingly been found not to have an undue adverse effect on sulfide and/or metal oxidation. The particular pH employed can also affect the salt form of the complexing agent employed, and such iron complexing salts are iron complexing agents within the scope of this invention.

The iron complexing agents can be added to the contacting step and/or can be formed in situ prior to or in the course of the contacting.

In certain embodiments, the present contacting step occurs in the presence of at least one added vanadium +5 component and/or at least one added copper +2 component in an amount effective to promote the oxidation of metal and/or sulfide from the metal sulfide. Any suitable vanadium +5 component and copper +2 component may be employed provided that such component is capable of promoting the oxidation of the metal and/or sulfide at the contacting conditions. Particularly preferred vanadium +5 components are vanadium pentoxide, i.e., $V_2O_5$, and complexes of vanadium +5. Among the particularly useful copper +2 components are copper +2 complexes with ligands such as pyridine, imidazole and their non-deleterious chelating derivatives, such as hydroxy, carboxyl, amino, alkyl, aryl, and halide substituents. Such copper +2 components are particularly effective when present in combination with an amount of ferric ion. In this embodiment, the copper +2 component acts to enhance the overall oxidation of the metal and/or sulfur from the metal sulfide. The vanadium +5 and/or copper +2 components can be added to the contacting step and/or can be formed in situ prior to or in the course of the contacting. If one or more of such components are present in the contacting, the vanadium +5 and/or copper +2 concentration is preferably at least about 10 ppm., more preferably about 50 ppm. to about 1.0% and still more preferably about 100 ppm. to about 0.1%, by weight of the aqueous composition present during the contacting, calculated as elemental vanadium and/or copper.

When vanadium +5 and/or copper +2 components are employed, the reducible manganese component is preferably capable of oxidizing and maintaining an effective amount of vanadium/copper component to the vanadium +5 and copper +2 states at the contacting conditions.

Any suitable aqueous composition may be employed in the present process. The pH of the composition is preferably acidic and may vary depending, for example, on the composition of the ore or ores being treated, the composition of the metal sulfide-containing material or reducible manganese-containing material being employed, and the presence or absence of other entities during the contacting. Preferably, the pH of the aqueous composition is in the range of about 0.1, more preferably about 0.5, to about 5. However, to enhance rate, the preferred pH of the aqueous composition is in the range of about 1.5 to about 4.5, more preferably about 3.0 and lower. Still more preferably, the pH of the aqueous composition is in the range of about 1.5 to about 3.0, with excellent results obtained with a pH in the range of about 1.5 to about 2.5.

If an effective amount of, for example, a Thiobacillus specie(s) is used, it is preferred to utilize a pH of about 3 or lower, preferably a pH of about 1.5 to about 2.5. It is believed that the use of promoter(s) in the process of this invention allows the use of wider ranges of pH's during processing in order to produce the desired improved recovery of metals as a function of time.

The pH of the aqueous composition may be adjusted or maintained during the contacting step, for example, by adding acid to the aqueous composition.

The aqueous composition comprises water, preferably a major amount of water. The composition is preferably substantially free of ions and other entities which have a substantial detrimental effect on the present process. Any suitable acid or combination of acids may be included in, or added to, this composition to provide the desired acidity. For example, hydrogen halides preferably hydrogen chloride, nitric acid, phosphoric acid, sulfuric acid, metal salts which decompose (in the aqueous composition) to form such acids, mixtures thereof and the like may be employed. Because of cost, availability and performance considerations, sulfuric acid is preferred. Quantity and concentration of the aqueous composition may be selected in accordance with the requirements of any given ore to be treated and as may be found advantageous for any given mode applying the process in practice.

In one embodiment, the present contacting occurs in the presence of added ferric ion in an amount effective to facilitate the liberating of the first metal from the first ore and/or the liberating of the second metal from the second ore. The ferric ion may be added to the contacting step separately, e.g., as $Fe(SO_4)_3$ and/or other components which produce the desired amount of ferric ion when combined with the present aqueous composition in the contacting step or may be generated in situ. In order to more effectively control the amount of ferric ion present and to provide improved contacting, it is preferred that the added ferric ion be combined with the aqueous composition prior to the present contacting step or adjusted, e.g., while recycling the aqueous composition, during ore processing. The amount of added ferric ion used in the present process is typically minor, when compared to the amount of ore or ores and metal sulfide-containing material and/or reducible manganese-containing material used, and may vary depending on many factors, for example, the composition of the ore or ores and of the metal sulfide-containing material and/or the reducible manganese-containing material and the degree of first and/or second metal liberation desired. Preferably, the added ferric ion is present in an amount of at least about 10 ppm. (by weight) of the aqueous composition. More preferably, the added ferric ion is present in an amount in the range of about 0.01% to about 1.0%, or even higher, by weight of the aqueous solution.

In one embodiment, the present contacting occurs in the presence of at least one species of Thiobacillus bacteria in an amount effective to facilitate the liberating of the first and second metals from the first and second ores, respectively. Since the contacting preferably results in at least a portion of the manganese in the first ore or reducible manganese-containing material being dissolved in the aqueous composition and since the bacteria is preferably present in the acidic composition, the bacteria are preferably tolerant (remain active) in such manganese-containing compositions. The aqueous compositions and the bacteria contained therein are maintained under regeneration conditions, i.e., at conditions conducive to the propagation of bacteria, during the contacting step.

As the contacting step progresses, the aqueous composition (the lixiviant solution) preferably becomes increasingly concentrated in dissolved manganese from the first ore or reducible manganese-containing material, in the form of manganese sulfate if sulfuric acid is employed. Above certain high concentrations of manganese, the buildup of manganese will in turn reduce the activity of the Thiobacillus bacteria. In practice, the contacting step is controlled, particularly through its initial stage, to produce effective quantities of adequately manganese tolerant bacteria, for example and preferably, by controlling the ratio of ore or ores to metal sulfide-containing material or to reducible manganese-containing material to aqueous composition and/or the bleed rate of the manganese-containing aqueous composition to insure a safe buildup rate of manganese ions in the aqueous composition. By increasing the proportion of solids to liquids, the manganese buildup rate in the aqueous composition is increased and vice versa. The manganese concentration, the total dissolved solid, and the bacterial activity in the aqueous composition can be monitored on a periodic basis as an aid to process control.

In instances where it is not practicable or desirable to exercise the required degree of control of the contacting step throughout the period of time required for developing suitably tolerant bacteria and where, consequently, it is preferred to commence the contacting step with an adequate supply of suitably tolerant bacteria, cultures of such bacteria may be prepared by known methods. Normally, the Thiobacillus bacteria can tolerate manganese in concentrations as high as 2.5 weight percent. In concentrations above 2.5 weight percent, the growth of the bacteria is slowed to a point at which bacteria become inactive. However, the bacteria can be and preferably are acclimated to higher concentrations of manganese ion by slowly increasing the manganese ion concentration level in the aqueous, acidic composition. By normal acclimation techniques, the manganese tolerance of the bacteria can be increased to greater than about 4 weight percent. The bacteria are preferably acclimated as much as possible and cost effective. Alternately, Thiobacillus bacteria may be acclimated to higher manganese levels using chemostate techniques operating in a continuous mode.

Sources of the Thiobacillus bacteria useful in this invention include sources such as the Americal Type Culture Center and bacteria found to be naturally occurring in ore bodies. Of the *Thiobacillus ferrooxidans* bacteria available from the Americal Type Culture Center, cultures ATCC-14119, ATCC-19859, ATCC-21834, and ATCC-33020 have been used in the process of this invention. All of these cultures have been found to be satisfactory.

The pH necessary for the bacterial action may preferably be as low as about 1.5 and as high as about 4.5 for the *Thiobacillus ferrooxidans* bacteria. However, if the bacteria are acclimated to a power pH, the pH of the aqueous composition in the present contacting step may be adjusted accordingly.

The aqueous composition should be maintained at a temperature to provide for effective contacting, preferably in the range of about 20° C. to about 140° C., more preferably about 25° C. to about 110° C., and still more preferably about 25° C. to about 80° C., at atmospheric or at elevated pressures, for example, up to about 500 psig, preferably atmospheric up to about 100 psig. When the bacteria are employed, such temperature should be such as to not unduly inhibit the growth of or destroy the bacteria. In some instances, bacterial activity has been maintained at a temperature as high as 75° C., though normal strains of the bacteria are best maintained at below about 60° C. which is the preferred upper limit. While limited activity is still apparent at 5° C., the preferred lower limit is about 15° C. More preferably, for the bacteria participation, the contacting occurs at a temperature in the range of about 15° C. to about 40° C. Still more preferably, the contacting temperature is in the range of about 20° C. to about 30° C. Both the temperature extremes and the preferred temperature ranges may be adjusted if the bacteria are acclimated to different ranges.

The bacteria are typically cultivated with nitrogen, phosphorous and sulfate, or utilize naturally occurring nutrients. Any suitable combination of compounds or components containing these constituents may be used to culture the bacteria. Suitable compounds include ammonia, ammonium sulfate, ammonium phosphate, alkali acid phosphate mixtures thereof and the like. Preferably, magnesium is also included in the culturing compounds or components and suitable magnesium content may be provided by adding magnesium sulfate.

In utilizing the process of this invention, certain precautions should preferably be taken to improve performance. For example, the raw materials and equipment utilized throughout the processing circuit should normally be such as will not release or act as bactericides under the conditions prevailing during the process. Minerals which may be harmful to the bacteria include the elements cobalt, zinc, nickel, copper, mercury, and molybdenum. Concentrations of these minerals found in pyrites normally do not exceed levels which would be harmful to the bacteria. Element concentrations which would be harmful to the bacteria are illustrated in *Zeitzchriferology Microbiology*, 12/72, 310. However, as with the maganese, these concentrations may be exceeded by the use of bacteria which have been acclimated to the harmful mineral.

The action of the bacteria on metal sulfides may produce an effective addition of sulfuric acid to the aqueous composition during the contacting step. Without limiting this invention to any theory or chemical/physical mechanism, it is postulated that this reaction is as follows:

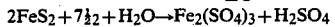

$$2FeS_2 + 7\tfrac{1}{2}O_2 + H_2O \rightarrow Fe_2(SO_4)_3 + H_2SO_4$$

In instances where the contacting step results in reducing the sulfuric acid content to the aqueous composition without a corresponding decrease in the ferric ion content, hydrolysis of the ferric sulfate is postulated to form sulfuric acid by the following reaction:

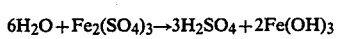

$$6H_2O + Fe_2(SO_4)_3 \rightarrow 3H_2SO_4 + 2Fe(OH)_3$$

This results in the precipitation of ferric salts. A controlled amount of oxygen, such as oxygen from air, is present in order to promote bacterial growth. In addition to promoting bacteria growth, the presence of an additional oxidant such as gaseous oxygen, in particular air, is preferred in the process of this invention and enhances the effectiveness of the contacting step in the presence of the metal redox couple promoters. Oxygen can be added during contacting and is generally present in a concentration to enhance the promoting effect and/or overall effectiveness of the process.

Air and air containing a reduced concentration of oxygen are very useful additional oxidants. Care should be exercised to avoid large excesses of the additional oxidant so as to minimize reactions that could solubilize deleterious elements, i.e., arsenic, etc. The amount of additional oxidant employed is preferably in the range of about 1% to about 125%, preferably about 2% to about 40% of that needed to oxidize by one oxidation state the total amount of metal and/or sulfur present in the ore fed to the present contacting step.

In order to utilize normal recovery techniques for the first metal (silver) content of a first ore, the manganese content of the first ore does not need to be reduced or eliminated. The first metal (silver) is at least partially liberated from the first ore. In other words, the manganese is at least partially disassociated from the silver, and not necessarily removed from the first ore. In order to disassociate the manganese from the first metal (silver), the manganese is preferably solubilized, for instance, as manganese sulfate. Desirably, the manganese sulfate may be removed from physical mixture with the first metal (silver) and redeposited within the first ore such that the liquid effluent from the process is not overly laden with the manganese sulfate since tihs sulfate may be an environmental concern.

The present contacting results in at least a portion of the reducible manganese component being chemcially reduced to form a reduced manganese component. This reducible/reduced manganese component exits the contacting zone and is separated from the ore, in particular the contacted second ore. This manganese component can be used on a once-through basis, or may be generated to reducible manganese component and recycled to the contacting zone. Such regeneration can be done by electrochemically oxidizing the manganese component or oxidizing manganese with molecular oxygen, preferably promoted for purposes of enhanced yield and rate, at elevated temperatures to convert the reduced manganese component to reducible manganese component.

The present process may be conducted on a batch or continuous basis. The present contacting step may be conducted on a pad, with the ore or ores to be treated situated in a heap; or in a vat, tank or other suitable arrangement. The primary criterion for the contacting step is that the desired manganese chemical reduction/sulfide metal solubilization and first and/or second metal liberation takes place. Preferably, the first metal, manganese-containing ore and metal sulfide-containing material and/or the second metal, metal sulfide-containing ore and reducible manganese-containing material are brought together to form an intimate admixture generally with the aqueous composition. If bacteria are employed, it is preferred that this intimate admixture also include the bacteria. If bacteria are utilized, the aqueous composition preferably includes one or more nutrients useful by the bacteria. One or more of these nutrients may be included with one or more of the ores, sulfide material, reducible manganese-containing material, intimate admixture and aqueous composition. Additional amounts of acid and/or ferric ion may be added during the contacting to provide the desired pH and ferric ion concentration.

The solid ore/material remaining after the contacting step may be subjected to any suitable metal recovery processing step or steps for the recovery of the first metal, e.g., silver, and the second metal, gold, the platinum group metals and the like. For example, this solid ore/material may be neutralized with any suitable basic material, such as white lime or milk of lime, and then subjected to a conventional sodium cyanide extraction, followed by activated carbon treatment and zinc dust precipitation. Alternately, the solid ore/material after contacting can be neutralized and subjected to an ammonium thiosulfate or an acid thiourea extraction followed by zinc dust precipitation. Still further, the solid ore/material after contacting can be subjected to a brine extraction followed by ion exchange to recover the desired metal or metals. The conditions at which these various recovery processing steps take place are conventional and well known in the art, and therefore are not described in detail here. However, it is important to note that conducting the metal recovery processing on the ore/material after the contacting of the present invention provides improved metal recovery performance relative to conducting the same metal recovery processing without this contacting.

One processing arrangement which provides outstanding results involves the agglomeration of the first metal, manganese-containing ore and the metal sulfide-containing material and/or the second metal, metal sulfide-containing ore and the reducible manganese-containing material. The ore and material are preferably subjected to crushing, grinding, or the like processing to reduce particle size to that desired optimum metallurgical liberation, generally a maximum particle diameter of about ½ inch or less. The ore and material particles are mixed with sufficient aqueous acid ($H_2SO_4$), and if desired, promoter and bacteria. This intimate admixture is formed into agglomerates by conventional processing, such as extruding, pilling, tableting and the like.

The agglomerates are placed on a pad, to form a heap which is built up by addition of agglomerates, preferably over a period of time in the range of about 15 days to about 60 days. During the time the heap is being built up, and preferably for a period of time ranging up to about 3 months, more preferably about 2 months to about 3 months after the last agglomerates are added to the heap, an aqueous ($H_2SO_4$) contacting composition with promoter, and preferably adjusted for pH, ferric ion and/or the presence of air, is made to flow through the heap, e.g., from the top to the bottom of the heap. If bacteria are used, the aqueous composition includes one or more nutrients for the bacteria. After contacting the heap, the aqueous composition is collected and processed for disposal, processed for manganese and/or sulfide metal recovery, and/or recycled to the heap. This contacting provides another important benefit in that at least a portion of the "cyanacides" such as copper, which may be present in the ore and/or metal sulfide-containing material is removed and/or deactivated. Such "cyanacides" cause substantial increases in cyanide consumption if present incyanide extraction processing. Therefore, removing and/or deactivating cyanacides in the present contacting step provides for more effective metals recovery by cyanide extraction.

After the heap/aqueous composition contacting has proceeded to the desired extent, an aqueous basic (e.g., white lime, milk of lime or the like basic components) composition is contacted with the heap to neutralize the heap. After this neutralization, the agglomerates may be placed on a second heap, which is preferably larger than the heap previously described.

In addition, the neutralized agglomerates may be broken apart and reagglomerated prior to being placed on the second heap to provide for any incidental acid neutralization and/or to expose the treated ore for subsequent cyanidation. This can be done using conventional means, such as subjecting the agglomerates to grinding, milling or the like processing, and then forming the second agglomerates by extruding, tableting, pilling, pelletizing or the like processing.

In any event, if a second, preferably larger, heap is formed on a pad, then a dilute aqueous cyanide, preferably sodium cyanide, solution is made to contact the second heap. Typically, this cyanide contacting is performed in the presence of air. Preferably, the cyanide solution is percolated through the second heap. The cyanide solution, after being contacted with the second heap, contains the first metal (silver) and/or the second metal. This solution is collected and sent to conventional further processing for recovery of the first and/or second metal.

Both heaps are preferably maintained at ambient conditions e.g., of temperature and pressure. Also, both heaps may be built up and worked (contacted) with the aqueous, acidic composition and the cyanide solution for as long as the economics of the particular application involved remain favorable.

When an agitated leach in vessels is used for the process, contact times may vary depending, for example, on the specific ore being contacted, the other components present during the contacting and the degree of metal recovery desired. Contact times in the range of about 5 minutes or less to about 48 hours or more may be used. Preferably, the contact time is in the range of about 4 hours to about 36 hours, more preferably about 8 hours to about 24 hours. During this time, agitation can be advantagesouly employed to enhance contacting. Known mechanical mixers can be employed.

While the present invention has been described with respect to various specific examples and embodiments, it is to be understood that the present invention is not limited thereto and that it can be variously practiced within the scope of the following claims.

The embodiments of the present invention in which an exclusive property or privilege is claimed are as follows:

1. A process for recovering silver from an ore containing reducible manganese comprising contacting said ore with an aqueous composition and a material containing at least one metal sulfide in the presence of a metal redox couple more positive than about +0.1 versus the standard hydrogen electrode, W. M. Latimer convention, at conditions effective to (1) chemically reduce said manganese, (2) oxidize at least one of said metal from said metal sulfide and said sulfide from said metal sulfide, and (3) liberate said silver from said ore, said redox couple being selected from the group consisting of (A) at least one iron complexing agent in an amount effective to promote the oxidation of at least one of saidmetal and said sulfide from said metal sulfide, (B) at least one vanadium component in which vanadium is present in an amount in the 5+ oxidation state effective to promote the oxidation of at least one of saidmetal and said sulfide from said metal sulfide, and mixtures thereof; and recovering said silver from said ore.

2. The process of claim 1 wherein said metal redox couple is more positive than about +0.5 versus said standard hydrogen electrode.

3. The process of claim 1 wherein said iron complexing agent is derived from a material selected from the group consisting of poly-functional amines, salts of poly-functional amines, phosphonic acids, phosphonic acid salts, pyridine, substituted chelating pyridine derivatives, glyoxime and salicylaldehyde derivatives, condensed phosphates and mixtures thereof.

4. The process of claim 1 wherein said metal sulfides have a formula of (Me)y S x wherein x and y are greater than zero and Me is a metal selected from the group consisting of Fe, Mo, As, Cu, Co, Ni, Sn, Sb, Bi, Pb, Zn and mixtures thereof.

5. The process of claim 1 wherein said metal sulfide is iron pyrites.

6. The process of claim 1 wherein said contacting occurs in the presence of added ferric ion.

7. The process of claim 1 wherein the pH of said aqueous composition is in the range of about 0.5 to about 5.0.

8. The process of claim 1 wherein said contacting occurs in the presence of Thiobacillus bacteria.

9. The process of claim 1 wherein said reducible manganese component includes manganese +3, manganese +4 and mixtures thereof.

10. The process of claim 1 wherein said contacting occurs in the presence of at least one added oxidant.

11. The process of claim 10 wherein said added oxidant comprises oxygen.

12. The process of claim 1 wherein said reducible manganese component is regenerated by oxidation of a reduced manganese component.

13. The process of claim 11 wherein said additional added oxidant acts to oxidize a reduced manganese component to form said reducible manganese component.

14. The process of claim 12 wherein said regeneration occurs separately from said contacting and said regenerated reducible manganese component is recycled to said contacting step.

15. The process of claim 3 wherein said vanadium component is a vanadium oxide and said copper component is selected from the group consisting of copper +2 complexes with ligands and mixtures thereof.

16. The process of claim 1 wherein said ore and said metal sulfide-containing material are agglomerated, and the resulting agglomerates are placed to form a first heap which is contacted with said aqueous composition.

17. The process of claim 16 wherein said agglomerates after said contacting are reagglomerated and placed on a second heap which is contacted with aqueous cyanide solution to solubilize silver.

18. The process of claim 1 wherein said metal redox couple is at least one vanadium component in which vanadium is present in an amount in the 5+ oxidation state effective is promote the oxidation of at least one of said metal from saidmetal sulfide and said sulfide from said metal sulfide.

19. The process of claim 10 wherein said additional added oxidant is air.

20. The process of claim 19 wherein said metal redox couple is at least one vanadium component in which vanadium is present in an amount in the +5 oxidation state effective is promote the oxidation of at least one of said metal from said metal sulfide and said sulfide from said metal sulfide.

21. A process for recovering at least one first metal selected from the group consisting of gold, silver, the platinum group metals and mixtures thereof from a ore containing said first metal and at least one metal sulfide of a metal other that manganese, said process comprising contacting said ore with an aqueous composition and at least one reducible manganese-containing material in the presence of a metal redox couple more positive than about +0.1 versus the standard hydrogen electrode, W.M. Latimer convention, at conditions effective to (1) chemically reduce said manganese, (2) oxidize at least one of said metal and said sulfide from said metal sulfide, and (3) liberate said first metal from said ore, said redox couple being selected from the group consisting of (A) at least one iron complexing agent in an amount effective to promote the oxidation of at least one of said metal and said sulfide from said metal sulfide, (B) at least one vanadium component in which vanadium is present in an amount in the 5+ oxidation state effective to promote the oxidation of at least one of said metal and said sulfide from said metal sulfide, and mixtures thereof; and recovering said first metal from said ore.

22. The process of claim 21 wherein said metal redox couple is more positive than about +0.5 versus said standard hydrogen electrode.

23. The process of claim 21 wherein said iron complexing agent is derived from a material selected from the group consisting of poly-functional amines, salts of poly-functioal amines, phosphonic acids, phosphonic acid salts, pyridine, substituted chelating pyridine derivatives, glyoxime and salicylaldehyde derivatives, condensed phosphates and mixtures thereof.

24. The process of claim 21 wherein said metal sulfides have a formula of (Me)y S x wherein x and y are greater than zero and Me is a metal selected from the group consisting of Fe, Mo, As, Cu, Ni, Sn, Sb, Bi, Pb, Zn, and mixtures thereof.

25. The process of claim 21 wherein said metal sulfide is iron pyrites.

26. The process of claim 21 wherein said contacting occurs in the presence of added ferric ion.

27. The process of claim 21 wherein the pH of said aqueous composition is in the range of about 0.5 to about 5.0.

28. The process of claim 21 wherein said contacting occurs in the presence of Thiobacillus bacteria, 29. The process of claim 21 wherein said reducible manganese component includes manganese +3; manganese +4 and mixtures thereof.

30. The process of claim 21 wherein said contacting occurs in the presence of at least one added oxidant.

31. The process of claim 30 wherein said added oxidant comprises oxygen.

32. The process of claim 21 wherein said reducible manganese component is regenerated by oxidation of a reduced manganese component.

33. The process of claim 31 wherein said added oxidant acts to oxidize a reduced manganese component to form said reducible manganese component.

34. The process of claim 32 wherein said regeneration occurs separately from said contacting and said regenerated reducible manganese component is recycled to said contacting step.

35. The process of claim 23 wherein said vanadium component is a vanaduim oxide and said copper component is selected from the group consisting of copper +2 complexes with ligands and mixtures thereof.

36. The process of claim 21 wherein said ore and said reducible manganese-containing material are agglomerated, and the resulting agglomerates are placed to form a first heap which is contacted with said aqueous composition.

37. The process of claim 36 wherein said agglomerates after said contacting are reagglomerated and placed on a second heap which is contacted with aqueous cyanide solution to solubilize said first metal.

38. The process of claim 21 wherein said first metal is gold.

39. The process of claim 21 wherein said metal redox couple is at least one vanadium component in which vanadium is present in an amount in the +5 oxidation state effective is promote the oxidation of at least one of said metal and said sulfide from said metal sulfide.

40. The process of claim 30 wherein said metal redox couple is at least one vanadium component in which vanadium is present in an amount in the +5 oxidation state effective is promote the oxidation of at least one of said metal and said sulfide from said metal sulfide.

41. The process of claim 40 wherein said metal redox couple is at least one vanadium component in which vanadium is present in an amount in the +5 oxidation state effective is promote the oxidation of at least one of said metal and said sulfide from said metal sulfide.

* * * * *

UNITED STATES PATENT AND TRADEMARK OFFICE
CERTIFICATE OF CORRECTION

PATENT NO. : 4,765,827
DATED : August 23, 1988
INVENTOR(S) : Thomas J. Clough, John W. Siebert and Arthur C. Riese It is certified that error appears in the above-identified patent and that said Letters Patent is hereby corrected as shown below:

Column 13, line 9; delete "saidmetal" and insert in place thereof --said metal--.

Column 13, line 13; delete "saidmetal" and insert in place thereof --said metal--.

Column 14, line 7; delete "saidmetal" and insert in place thereof --said metal--.

Signed and Sealed this

Twentieth Day of December, 1988

Attest:

DONALD J. QUIGG

Attesting Officer

Commissioner of Patents and Trademarks